L. FINEBERG.
HEATING AND SHAPING DEVICE.
APPLICATION FILED AUG. 13, 1910.
1,068,638.
Patented July 29, 1913.
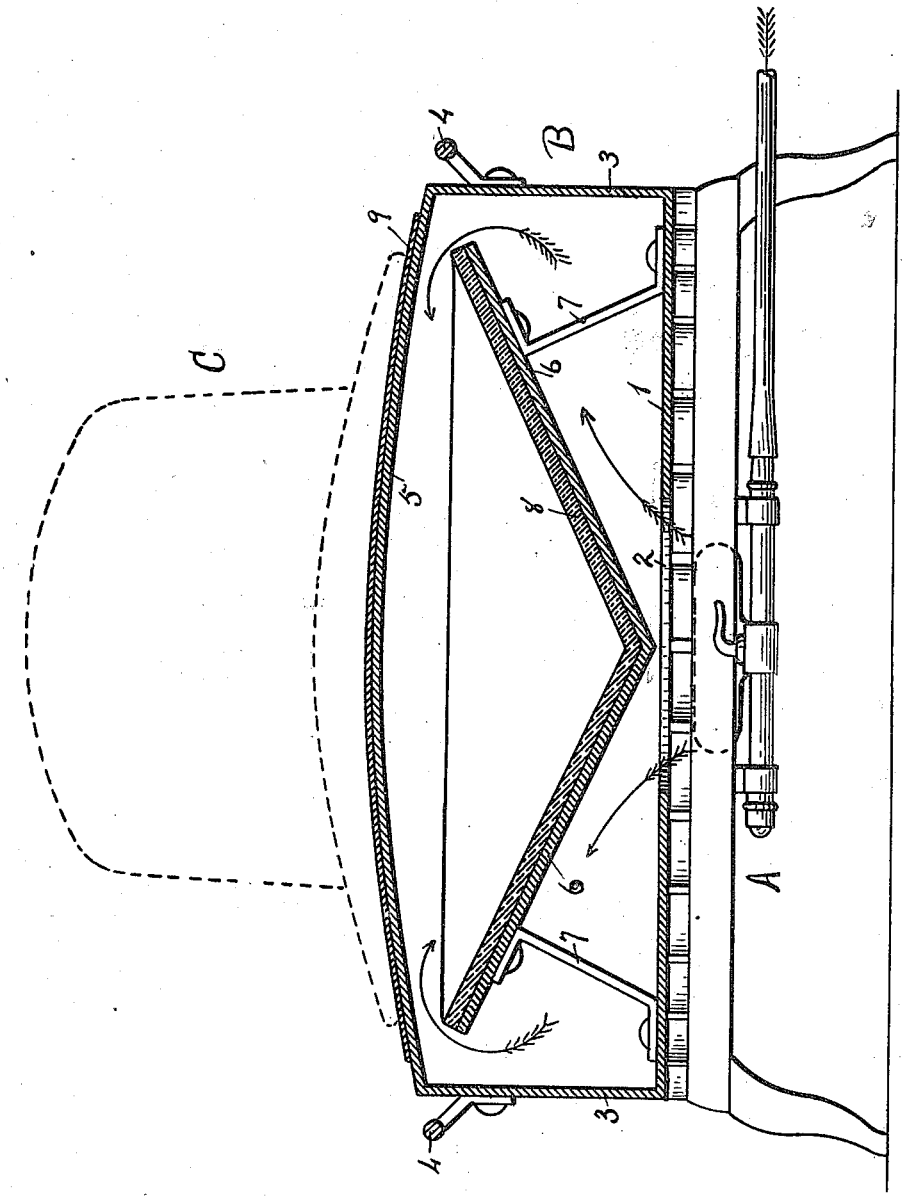
Witnesses
W. S. Bates
J. F. Stanton
Inventor
Louis Fineberg
by A. S. Paré
Attorney

UNITED STATES PATENT OFFICE.

LOUIS FINEBERG, OF SAN FRANCISCO, CALIFORNIA.

HEATING AND SHAPING DEVICE.

1,068,638.  Specification of Letters Patent.  Patented July 29, 1913.

Application filed August 13, 1910. Serial No. 577,070.

*To all whom it may concern:*

Be it known that I, LOUIS FINEBERG, of San Francisco, California, have invented certain new and useful Improvements in Heating and Shaping Devices, whereof the following is a specification.

This invention relates to heating devices; and it is an object of the invention, to heat the brims of hats, so as to facilitate their manipulation into shape, without unduly heating the crowns of said hats.

In carrying out the invention I provide a heat chamber, which may be set upon an ordinary stove. This heat chamber has an opening at the bottom through which hot air and hot gases from the stove pass to its interior. Inside the chamber is a deflector or baffle plate in the form of an inverted cone, which deflects said hot air and gases toward the periphery of the chamber, whence they turn inward toward the middle of the chamber. This deflector is provided with an asbestos, or equivalent, lining, to prevent the conduction of heat through, and radiation from it to the top of the chamber. The top of the chamber is curved to correspond with the ordinary curve of a hat brim from front to rear. Upon this curved top is laid a thin sheet of asbestos and the hat is placed upon the asbestos. When heated so as to be sufficiently pliable, the hat may be placed on the head of the wearer, and shaped to his head, and in a few minutes it will cool sufficiently to permanently retain such shape, when it may be removed from the wearer and the brim further heated for further manipulation if desired.

In the accompanying sheet of drawing I have illustrated my invention as embodied in what I consider its best form, it being understood however that I do not desire to be limited to the precise instrumentalities shown, except as so specified in the claim at the end hereof.

The figure, in the drawing, shows a sectional elevation of the heat chamber, resting upon a gas stove, which is shown in elevation, and a hat, in dotted lines, in position to be treated by the apparatus.

A represents the gas stove, B the heat chamber, and C the hat thereon. The heat chamber comprises the bottom 1, open at 2 above the burner of the stove, side walls 3, provided with handles 4, and curved top 5. 6 is a conical deflector, or baffle plate, inside the chamber B, with its apex turned downward and above the burner of the stove, and its basal periphery approaching the upper peripheral angle of the chamber. The deflector is supported in position by suitable legs or brackets 7 from any convenient part of chamber A, but preferably from the bottom or floor thereof, as shown; for when supported from above, (as in the prior art) the heat is conducted through the hangers or supports to the top surface; resulting not only in the uneven heating of said surface and likelihood of warping and cracking thereof; but may even result in scorching the hat at the junction of the hangers or supports with the top. Such hangers, not only by conduction, cause this uneven heating, but also by acting as barriers to the flame; causing it to be intensified on one side of the hanger and to be reduced on the opposite side. Applicant avoids these very objectionable features by supporting his conical deflector from underneath. In order that the deflector, which is exposed to the direct heat of the stove, may not radiate heat to top 5, I make use of a non-conducting lining 8, which may be of asbestos, and is usually applied to the deflector. The hot air and gases from the stove follow the course indicated by arrows around the edge of the deflector toward the middle of the chamber, and heat the top 5 thereof. This heat is communicated to the hat C which rests upon said top. An asbestos sheet 9 may be interposed between the hat and the surface of the top plate to equalize the distribution of heat to the hat, and to prevent radiation thereof into the crown which would unduly and unnecessarily heat the latter. The brim of the hat having been sufficiently heated in the manner just described it may be manipulated to the desired shape, and may even be placed upon the head of the expectant wearer and made to conform to the shape of his head. By keeping it on his head for a few minutes till it sets said shape will be permanently fixed.

Obviously the above apparatus may be used for heating other objects besides hats, and I contemplate using it for all such purposes to which it is applicable.

Having thus described my invention and an operative embodiment thereof, and believing that I have made a new and valu- able improvement in the art to which it pertains, what I claim and desire to secure by Letters Patent is:—

In a hat brim heater, a heating chamber having an apertured bottom, an inverted conical deflector supported over the aperture by means of brackets disposed between the conical deflector and the bottom of the chamber, and means for applying a heating element through the apertured bottom, to the conical deflector, whereby the periphery of said top is heated uniformly.

In testimony that I claim the foregoing I have hereto set my hand this 30th day of July, 1910, before two witnesses.

LOUIS FINEBERG.

Witnesses:
L. H. PAINE,
D. B. RICHARDS.

Copies of this patent may be obtained for five cents each, by addressing the "Commissioner of Patents, Washington, D. C."